(12) United States Patent
Douglas et al.

(10) Patent No.: US 8,818,691 B2
(45) Date of Patent: Aug. 26, 2014

(54) EXHAUST SYSTEM AND METHOD FOR CONTROLLING TEMPERATURE OF EXHAUST GAS IN AN EXHAUST SYSTEM

(75) Inventors: Scot A. Douglas, Howell, MI (US); Michael J. Paratore, Jr., Howell, MI (US); Jason Daniel Mullins, Brighton, MI (US); Patrick Barasa, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 13/419,221

(22) Filed: Mar. 13, 2012

(65) Prior Publication Data

US 2013/0245918 A1 Sep. 19, 2013

(51) Int. Cl.
| | | |
|---|---|---|
| F02D 41/30 | (2006.01) | |
| F01N 3/023 | (2006.01) | |
| F01N 3/025 | (2006.01) | |
| F01N 3/027 | (2006.01) | |
| F02D 41/02 | (2006.01) | |
| F02D 41/00 | (2006.01) | |

(52) U.S. Cl.
CPC .......... F01N 3/023 (2013.01); F01N 3/025 (2013.01); F01N 3/0253 (2013.01); F01N 3/027 (2013.01); F02D 41/024 (2013.01)
USPC ............................ 701/103; 123/676

(58) Field of Classification Search
CPC ....... F01N 3/023; F01N 3/025; F01N 3/0253; F01N 3/027; F02D 41/024
USPC ............ 701/102, 103, 104; 123/676; 60/274, 60/295, 311, 286, 285, 605.2
See application file for complete search history.

(56) References Cited

U.S. PATENT DOCUMENTS

| | | | | |
|---|---|---|---|---|
| 8,245,501 | B2 * | 8/2012 | He et al. ........................ | 60/286 |
| 2009/0235649 | A1 * | 9/2009 | Zhang et al. ................... | 60/286 |
| 2010/0083639 | A1 * | 4/2010 | Mullins et al. ................. | 60/285 |
| 2010/0186384 | A1 * | 7/2010 | Gonze et al. ................... | 60/286 |
| 2010/0205943 | A1 * | 8/2010 | Gonze et al. ................... | 60/286 |
| 2011/0219753 | A1 * | 9/2011 | Tewari et al. .................. | 60/287 |
| 2011/0265450 | A1 * | 11/2011 | Barasa ........................... | 60/274 |

* cited by examiner

Primary Examiner — Mahmoud Gimie
(74) Attorney, Agent, or Firm — Cantor Colburn LLP

(57) ABSTRACT

In one exemplary embodiment of the invention, an internal combustion engine includes a fuel system in fluid communication with a cylinder to direct a fuel flow to be mixed with air in the cylinder and an exhaust system in fluid communication with the cylinder to receive an exhaust gas produced by the combustion process, wherein the exhaust system includes an oxidation catalyst, a particulate filter downstream of the oxidation catalyst. The system also includes a control module that determines an amount of energy to be provided by at least one of: a post-injection process, hydrocarbon injector, and heating device, wherein the amount of energy is based on a desired temperature at a selected location in the exhaust system, an exhaust gas flow rate, a temperature of the received exhaust gas, a flow rate and temperature of the exhaust gas at the inlet of the oxidation catalyst.

17 Claims, 2 Drawing Sheets

EXHAUST SYSTEM AND METHOD FOR CONTROLLING TEMPERATURE OF EXHAUST GAS IN AN EXHAUST SYSTEM

FIELD OF THE INVENTION

The subject invention relates to exhaust systems and, more specifically, to methods and systems for controlling the temperature at one or more selected locations in exhaust systems.

BACKGROUND

An engine control module of an internal combustion engine controls the mixture of fuel and air supplied to combustion chambers within cylinders of an engine. After the air/fuel mixture is ignited, combustion takes place and later the combustion gases exit the combustion chambers through exhaust valves. The combustion gases are directed by an exhaust manifold to a catalytic converter or other components of an exhaust aftertreatment system. Some engines optionally may include a forced air induction device, such as a turbocharger, that is positioned between the exhaust manifold and exhaust aftertreatment components.

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide, particulate matter, and other particulates. In order to reduce the emissions of internal combustion engines, an exhaust aftertreatment system is used to reduce these constituents from the exhaust gas.

Exhaust gas aftertreatment systems typically include one or more aftertreatment devices, such as particulate filters, catalytic converters, mixing elements and urea/fuel injectors. Control of temperature of the exhaust gas can affect the performance of components within the exhaust system. For example, a particulate filter is configured to remove carbon particles or particulates that result from incomplete combustion of a hydrocarbon fuel, also referred to as soot, from the exhaust gas. Particulate filters are typically designed to accumulate a selected amount of soot within the device. Particulate filters may be configured to periodically burn off the accumulated soot through a regeneration process. The regeneration process may be initiated by increasing a temperature of the exhaust gas entering the particulate filter, wherein the elevated temperature causes the soot to burn. Thus, accurate control of the exhaust gas temperature at selected locations in the exhaust system can lead to improved performance and reduced emissions.

SUMMARY OF THE INVENTION

In one exemplary embodiment of the invention, an internal combustion engine system includes a cylinder, a fuel system in fluid communication with the cylinder to direct a fuel flow to be mixed with air in the cylinder for a combustion process and an exhaust system in fluid communication with the cylinder to receive an exhaust gas produced by the combustion process, wherein the exhaust system includes an oxidation catalyst, a particulate filter downstream of the oxidation catalyst. The system also includes a control module that determines an amount of energy to be provided by at least one of: a post-injection process using the fuel system, a hydrocarbon injector, and a heating device configured to heat the exhaust gas in the particulate filter, wherein the amount of energy to be provided is based on a desired temperature at a selected location in the exhaust system, a flow rate of the exhaust gas, a temperature of the exhaust gas received by the exhaust system, a flow rate of the exhaust gas at an inlet of the oxidation catalyst and a temperature of the exhaust gas at the inlet of the oxidation catalyst.

In another exemplary embodiment of the invention, a method for controlling temperature of exhaust gas in an exhaust system of an internal combustion engine includes determining a flow rate of the exhaust gas, determining a temperature of the exhaust gas received by the exhaust system, determining a space velocity of the exhaust gas at an inlet of an oxidation catalyst and determining a temperature of the exhaust gas at the inlet of the oxidation catalyst. The method also includes determining an amount of energy to be provided by at least one of a post-injection process using a fuel system coupled to a cylinder of the internal combustion engine, a hydrocarbon injector in the exhaust system and a heating device proximate a particulate filter, wherein the amount of energy to be provided is based on a desired temperature at a selected location in the exhaust system, the flow rate of the exhaust gas, the temperature of the exhaust gas received by the exhaust system, the flow rate of the exhaust gas at the inlet of the oxidation catalyst and the temperature of the exhaust gas at the inlet of the oxidation catalyst. The method also includes communicating at least one of: a signal to control an amount of fuel to the exhaust gas in the cylinder corresponding to the amount of energy to be provided by the post-injection process, a signal to control an amount of fuel from the hydrocarbon injector to the exhaust system corresponding to the amount of energy to be provided by the hydrocarbon injector and a signal to control a current sent to the heating device corresponding to the amount of energy to be provided by the heating device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
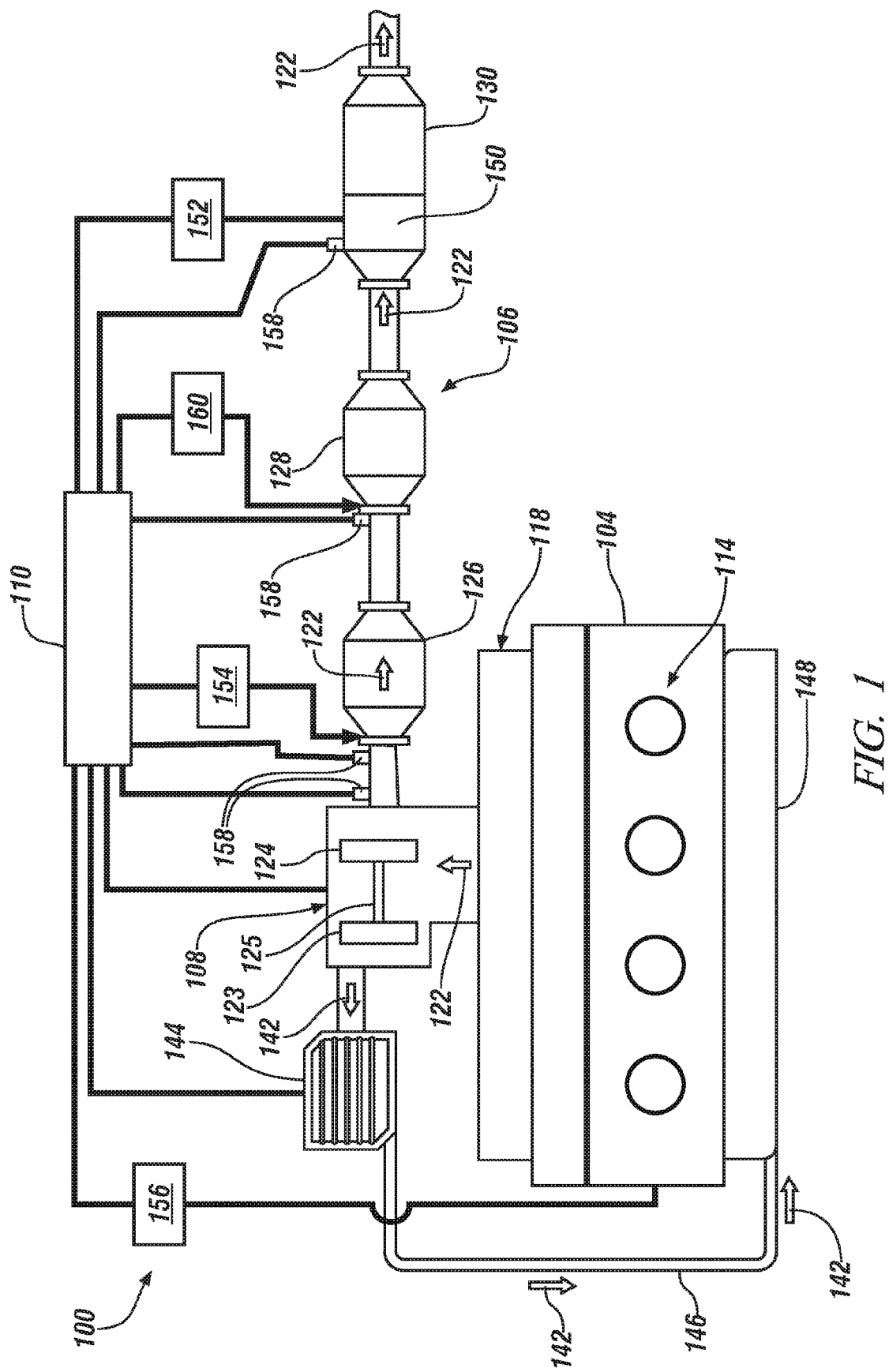
FIG. 1 is a diagram of an exemplary internal combustion engine and associated exhaust treatment system.

The following description is merely exemplary in nature and is not intended to limit the present disclosure, its application or uses. It should be understood that throughout the drawings, corresponding reference numerals indicate like or corresponding parts and features. As used herein the term controller or control module refers to an application specific integrated circuit (ASIC), an electronic circuit, a processor (shared, dedicated or group) and memory that executes one or more software or firmware programs, a combinational logic circuit, and/or other suitable components that provide the described functionality.

In accordance with an exemplary embodiment of the invention, FIG. 1 illustrates an exemplary internal combustion engine 100, in this case an in-line four cylinder diesel engine, including an engine block and cylinder head assembly 104, an exhaust system 106, a turbocharger 108 and a control module 110 (also referred to as a "controller"). Coupled to the engine block and cylinder head assembly 104 is an exhaust manifold 118. In addition, the engine block and cylinder head assembly 104 includes cylinders 114 wherein the cylinders 114 receive a combination of combustion air and fuel supplied from a fuel system 156. The combustion air/fuel mixture is combusted resulting in reciprocation of pistons (not shown) located in the cylinders 114. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas through the exhaust manifold 118 and turbocharger 108 and into the exhaust system 106. In an embodiment, the turbocharger 108 includes a compressor wheel 123 and a turbine wheel 124 coupled by a shaft 125 rotatably disposed in the turbocharger 108.

An exhaust gas flow 122 resulting from combustion within cylinders 114 drives the turbine wheel 124 of turbocharger 108, thereby providing energy to rotate the compressor wheel 123 to create a compressed air charge 142. In an exemplary embodiment, the compressed air charge 142 is cooled by a charge cooler 144 and is routed through a conduit 146 to an intake manifold 148. The compressed air charge 142 provides additional combustion air (when compared to a non-turbocharged, normally aspirated engine) for combustion with fuel in the cylinders 114, thereby improving the power output and efficiency of the internal combustion engine 100.

The exhaust gas 122 flows through the exhaust system 106 for the removal or reduction of particulates and is then released into the atmosphere. The exhaust system 106 may include catalyst devices, such as oxidation catalyst ("OC") device 126 and a selective catalytic reduction ("SCR") device 128, as well as a particulate filter ("PF") 130. The OC 126 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. The oxidation catalyst compound may be applied as a wash coat and may contain platinum group metals such as platinum (Pt), palladium (Pd), rhodium (Rh) or other suitable oxidizing catalysts. The SCR device 128 may also include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 122 in the presence of a reductant such as ammonia ($NH_3$). An $NH_3$ reductant may be supplied from a fluid supply 160 (reductant supply) and may be injected into the exhaust gas 122 at a location upstream of the SCR device 128 using an injector. The reductant may be in the form of a gas, a liquid, or an aqueous urea solution and may be mixed with air in the injector to aid in the dispersion of the injected spray.

The particulate filter PF 130 may be disposed downstream of the SCR device 128. The PF 130 operates to filter the exhaust gas 122 of carbon and other particulates. In embodiments, the PF 130 may be constructed using a ceramic wall flow monolith filter that is wrapped in an intumescent mat or other suitable support that expands when heated, securing and insulating the filter. The filter may be packaged in a shell or canister that is, for example, stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 122 entering the filter through the inlet ends of the inlet passages is forced to migrate through adjacent longitudinally extending walls to the outlet passages. It is through this exemplary wall flow mechanism that the exhaust gas 122 is filtered of carbon (soot) and other particulates. The filtered particulates are deposited on the longitudinally extending walls of the inlet passages and, over time, will have the effect of increasing the exhaust gas backpressure experienced by the internal combustion engine 100. It should be understood that the ceramic wall flow monolith filter is merely exemplary in nature and that the PF 130 may include other filter devices such as wound or packed fiber filters, open cell foams, sintered metal fibers, etc.

The accumulation of particulate matter within the PF 130 is periodically cleaned, or regenerated to reduce backpressure. Regeneration involves the oxidation or combustion of the accumulated carbon and other particulates (also referred to as "soot") in what is typically a high temperature (e.g., at or above 600° C.) environment. In an embodiment, an elevated soot level is sensed in the PF 130 and a regeneration process may be performed. In an embodiment, the control module 110 determines loading of soot in the PF 130. The regeneration process may involve several components and have one or more stages. In one embodiment, the regeneration process includes an introduction of heat into the exhaust aftertreatment system 106 by introducing fuel (hydrocarbons or HC) via an injector, such as hydrocarbon injector ("HCI") 154 directly into the exhaust gas 122 as it flows into catalysts, such as OC 126 and SCR device 128. A selected amount of fuel is directed from the HCI 154 into the exhaust gas 122 and is combusted over the OC 126 and SCR device 128, causing an increased temperature for exhaust gas flow 122 into the PF 130. In the depicted embodiment, the control module 110 is coupled to the HCI 154 and is configured to control the amount of fuel to be directed into the exhaust gas flow 122, wherein the resulting increased exhaust gas temperature burns the trapped soot particles downstream within the PF 130.

In an embodiment, the regeneration process includes a heating device 150 controlled by the control module 110, wherein operation of the heating device 150 is based on sensed elevated soot levels. When the determined soot level achieves a threshold level (e.g., 5 grams/liter of soot) and the exhaust flow rate is within a desired range, the control module controls a current sent to the heating device 150 via a power source 152 to initiate the regeneration process. The heating device 150 may be constructed of any suitable material that is electrically conductive such as a wound or stacked metal monolith. The power source 152 is connected to an electrical system, such as a vehicle electrical system, and supplies electricity to the heating device 150. The heating device 150, when heated, increases the temperature of exhaust gas 122 passing through the heating device 150 and/or increases the temperature of portions of the filter 130 at or near the heating device 150. The duration of the regeneration process varies based upon the amount of particulate matter within the PF 130. In one aspect, current is only applied during an initial portion of the regeneration process. More specifically, the electric energy from the current is directed to the heating device 150 which heats the inlet of the PF 130 for a selected period (e.g., 1-2 minutes). The remainder of the regeneration process is achieved using the heat generated by combustion of particulate matter present in the PF 130.

Regeneration methods may also inject fuel into the exhaust gas flow 122 after the main combustion event within the cylinders 114. This process may be referred to as post-injection or late post-injection of fuel, wherein the fuel system 156 provides the selected amount of fuel into cylinders to add to the exhaust gas flow 122, for combustion within the exhaust system 106. The post-combustion injected fuel is combusted over one or more catalysts, such as OC 126 and SCR device 128, in the exhaust system 106. The heat released from the fuel combustion on the catalysts increases the exhaust temperature, which burns the trapped soot particles in the PF 130 located downstream of the catalysts 126, 128. The control module 110 controls the amount of fuel provided by the fuel system 156 during the post-injection process. The selected amount of fuel injected for post-injection may be determined by the control module 110 based on various information, such as sensed parameters, component specifications and system configuration.

In an exemplary internal combustion engine 100, the control module 110 is in signal communication with the turbocharger 108, the charge cooler 144, the power source 152, HCI 154, the fuel supply 156, sensors 158, and the exhaust system 106, wherein the control module 110 is configured to use various signal inputs to control various processes. In embodiments, the control module 110 is coupled to and configured to receive signal inputs from sensors 158 that includes information, such as temperature (intake system, exhaust system, engine coolant, ambient, etc.), pressure, exhaust flow rates, soot levels, NOx concentrations, exhaust gas constituencies (chemical composition) and other parameters. The control module 110 is configured to perform selected processes or operations based on the sensed parameters, such as regeneration processes based on elevated soot levels in the particulate filter 130. Exemplary sensors 158 are positioned at an outlet of the turbocharger 108, an inlet of the OC 126 and an inlet of the SCR device 128.

In embodiments, the control module 110 uses at least one of the regeneration processes, such as the post-injection via fuel supply 156, HCI 154 and heating device 150 to regenerate the PF 130. The depicted arrangement provides a method and system for determining a balanced and efficient use of the regeneration components (i.e., post-injection process with fuel supply 156, HCI 154, heating device 150). The arrangement determines the appropriate amount of energy to be provided by each of the regeneration components based on a desired temperature for the exhaust gas flowing into the PF 130, sensed exhaust gas parameters, component specifications, energy losses in the system and other information. Accordingly, an embodiment coordinates exhaust system 106 components to provide improved control and optimization of the regeneration process by controlling temperature at a selected location in the exhaust system 106. Further, the arrangement may be used to determine the amount of energy to be contributed by each regeneration component based on the available components, and configuration thereby enabling optimization of regeneration across various platforms.

In addition, the depicted system 106 may be used to determine balanced energy contribution from available components, which may be used to control temperature of exhaust gas entering components of the system, such as the OC 126 and/or SCR device 128, to improve emissions performance by achieving a desired temperature in the components for effective particulate or constituent removal.

Figure 2:
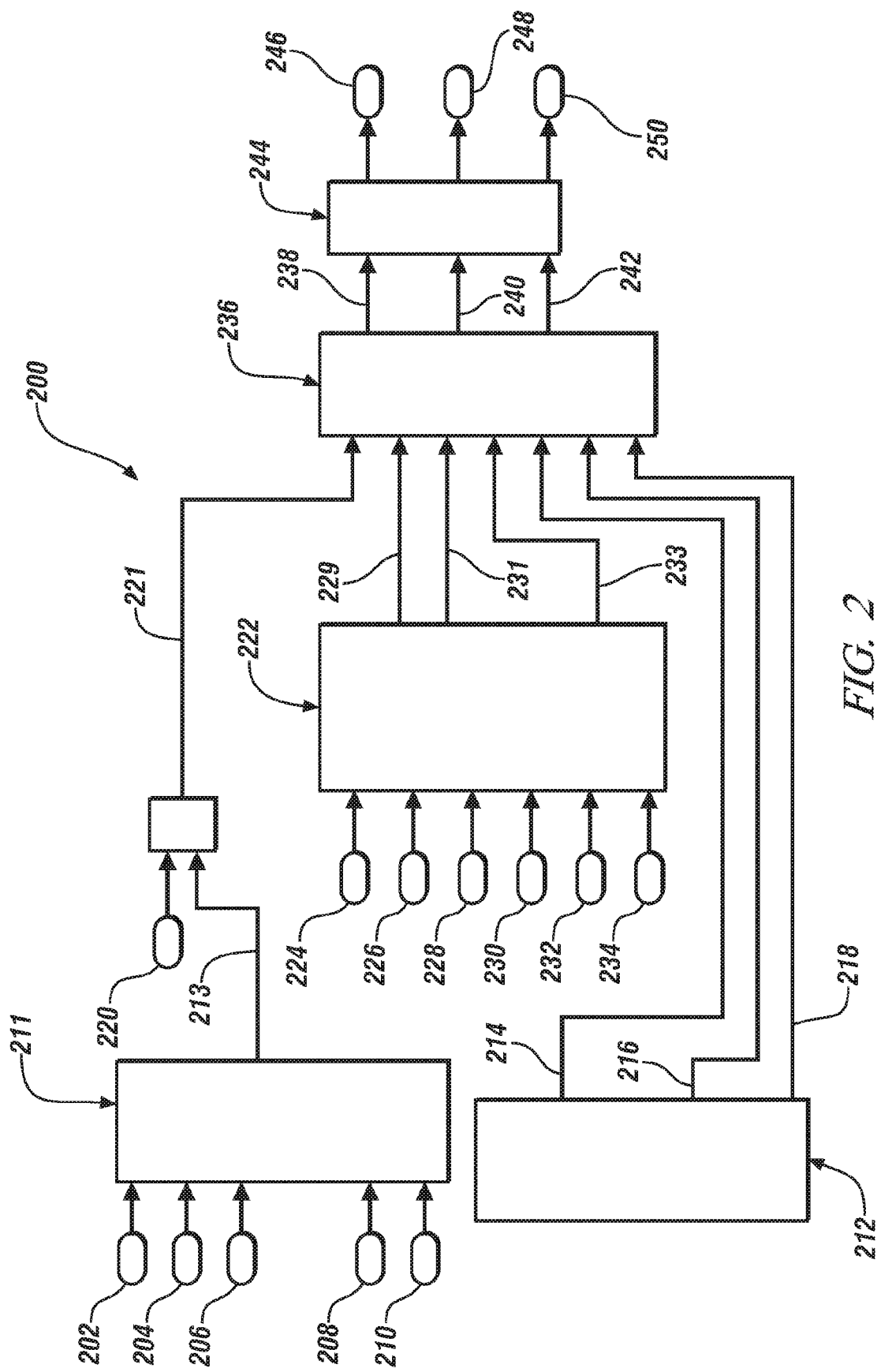
FIG. 2 is diagram of an exemplary method for determining the amount of energy to be contributed by each exhaust system regeneration process.

FIG. 2 is a diagram 200 of an exemplary method and system for determining the amount of energy to be contributed by each exhaust system regeneration process and/or associated exhaust system component(s). The diagram 200 may apply to an exhaust system to attain a desired temperature at a selected location in the system. For ease of explanation, the steps of diagram 200 are explained with reference to the exemplary internal combustion engine 100 of FIG. 1, however, it should be understood that the method and system may be performed by any suitable internal combustion engine system. The steps of the diagram 200 may be performed by one or more control module, such as control module 110, in a system. An exhaust flow rate parameter 202 represents a mass flow rate of exhaust gas from the turbocharger 108. In an embodiment, the exemplary exhaust flow rate parameter 202 is determined using one of the sensors 158 positioned downstream of the turbocharger 108, such as proximate the turbocharger 108 outlet. In another embodiment, the exhaust flow rate parameter 202 is determined using another suitable method, such as by modeling the exhaust system. A specific heat parameter 204 represents the specific heat for the exhaust gas flowing from the turbocharger 108, wherein the specific heat may be determined based on temperature and the composition of the exhaust gas at the location. A temperature parameter 206 represents the temperature of the exhaust gas flowing from the turbocharger 108, wherein the temperature is determined by any suitable method, such as modeling or measurements of one of the sensors 158 proximate the turbocharger 108 outlet.

A specific heat parameter 208 represents the specific heat for the exhaust gas at a selected location in the exhaust system 106 where exhaust temperature is being controlled (also referred to as "temperature control location"). The specific heat parameter 208 may be calculated and/or determined based on the desired temperature at the temperature control location and composition of the exhaust gas. A temperature parameter 210 represents the desired exhaust gas temperature at the temperature control location. In an embodiment, the desired temperature is the temperature at which regeneration is initiated in the PF 130, wherein the temperature control location is proximate the inlet of the PF 130. Accordingly, the desired temperature (temperature parameter 210) is an input provided to enable balanced operation of the exhaust system 106, wherein the control module 110 optimizes regeneration based on inputs, including temperature parameter 210, system conditions, system models, component efficiencies, system energy losses and available components in the system.

The inputs are received by a module or block 211, wherein the block processes the inputs to provide an energy value 213, wherein the energy value is the amount of energy needed to achieve the desired temperature at the temperature control location. In one embodiment, the temperature parameters 206 and 210 are multiplied by the specific heat parameters 204 and 208, respectively, to produce specific heat-temperature values. A difference is then calculated for the resulting specific heat-temperature values for the desired temperature 210 as compared to the actual temperature 206 from the turbine outlet. The difference is then multiplied by the exhaust flow rate parameter 202 to provide the energy value 213, which represents the gross energy needed to achieve the desired temperature 210.

A group of component parameters are represented by block 212, wherein the parameters represent the gross energy available under current conditions for each regeneration process or component used to control exhaust gas temperature. A gross HCI energy 214 represents the amount of gross energy currently available from the HCI 154 injecting fuel into the exhaust gas. A gross post-injection energy 216 represents the amount of gross energy available from the fuel system 156 performing post-injection of fuel into exhaust gas in the cylinders 114. A gross heating device energy 218 represents the amount of gross energy currently available from the heating device 150 to heat the exhaust gas entering or within the PF 130. In an embodiment, the gross energy values in block 212 are based on component specifications at selected operating conditions, wherein the values indicate ideal performance under ideal conditions.

The energy value 213, corresponding to the amount of gross energy needed for the desired temperature at the selected location, is combined with an energy loss value 220. The energy loss value 220 represents the amount of energy lost up to the temperature control location. For example, the energy loss value 220 may represent the energy losses due to various factors, including energy lost at the inlet to the PF 130 due to heat loss, fluid dynamics, thermal mass and other factors in the exhaust system 106. Accordingly, the combination of the values for 213 and 220 result in the total energy needed to attain the desired temperature for the temperature control location accounting for conditions and losses in the system, which is represented by the total energy value 221.

Block 222 represents an efficiency determination for the components in the exhaust system, such as the OC 126, SCR device 128 and heating device 150. In an embodiment, efficiencies for each component are based on several factors, such as the arrangement of components in the system, the received exhaust gas temperature and the space velocity of the received exhaust gas. Specifically, an OC space velocity 224 represents a value based on exhaust gas mass flow rate and the volume of the OC 126. The OC space velocity 224 also takes flow efficiency of the exhaust gas in the OC 126 into consideration, wherein the flow efficiency is a result of properties of a substrate within the OC 126, temperature of the exhaust gas, a washcoat in the OC 126 and how long the exhaust resides in the OC 126. An embodiment uses a mass flow rate measurement take by the sensor 158 proximate the inlet of the OC 126, volumetric properties of the OC 126, weight of exhaust gas constituents and other factors to determine the OC space velocity 224. The resulting determined OC space velocity 224 is one of the inputs to the efficiency block 222. An additional input is an OC temperature 226 that represents the exhaust gas temperature entering the OC 126 which may also be measured by the sensor 158 proximate the OC 126 inlet. An SCR space velocity 228 is a parameter based on an exhaust gas mass flow rate, the SCR device 128 volume and change in volume, properties of a substrate in the SCR device 128, an SCR device washcoat and residence time for the exhaust gas in the SCR device 128. An SCR device temperature 230 represents the temperature of the exhaust gas entering the SCR device 128. A heating device space velocity 232 represents an exhaust gas flow rate based on the heating device 150 volume and change in volume as well as residence time for the exhaust in the heating device 150. Further, a heating device temperature 234 represents the temperature of the exhaust gas entering the heating device 150. The values received by efficiency block 222 may be determined by any suitable method, such as one or more of the following, sensor measurement, modeling, calculations or any combination thereof.

The efficiency block 222 receives the values 224, 226, 228, 230, 232, 234 and determines efficiencies for the OC 126, SCR device 128 and heating device 150, wherein the efficiencies for each device correspond to outputs 229, 231 and 233, respectively. In an embodiment, block 222 determines the efficiencies based on the input values as well as exhaust system arrangement and component information. In an embodiment, the efficiencies for each component may be determined in a look-up table provided for each component, wherein the space velocity and temperature values are matched to a corresponding efficiency output for each component.

A prioritization block 236 receives various inputs to determine balanced energy contributions to heat the exhaust gas from available exhaust system 106 components. Inputs to the prioritization block 236 include the total energy value 221, gross HCI energy 214, gross post-injection energy 216, gross heating device energy 218, as well as OC efficiency 229, SCR device efficiency 231 and heating device efficiency 233. The prioritization block 236 receives these inputs and determines a balanced distribution of energy to attain the desired temperature for the temperature control location. Specifically, an HCI energy contribution 238 represents the amount of energy the HCI 154 provides to heat the exhaust gas. A post-injection energy contribution 240 represents the amount of energy the post-injection process, using the fuel system 156 into cylinders 114, provides to heat the exhaust gas. A heating device energy contribution 242 represents the amount of energy (e.g., Watts) the heating device 150 provides to heat the exhaust gas. It should be noted that some embodiments of the exhaust system may not include certain components, wherein a contribution for the regeneration process using those component will be zero.

In one embodiment, the process of energy contribution balancing that occurs within prioritization block 236 determines a total energy requirement (e.g., value 221) and compares the requirement value with the available energy (e.g., determined in block 212). If energy is required to control temperature in the system, the process determines the most efficient components and processes available for regeneration, wherein corresponding control commands are sent to the components to add the energy to heat the exhaust gas. The system and process evaluates each available energy source (i.e., post-injection process, HCI, heating device), wherein energy sources are the processes and associated components that may be used for heating exhaust gas. Evaluation of each energy source may include determining the minimum and maximum available energy from each source and associated components. The evaluation may also include applying the efficiencies of related exhaust system components, wherein the efficiencies enable determination of an optimal and balanced distribution of energy between available sources.

In embodiment, the values for HCI energy contribution 238, post-injection energy contribution 240 and heating device energy contribution 242 are inputs to a command block 244. The command block 244 provides commands to control one or more components of the exhaust system 106 associated with regeneration or exhaust gas temperature control, wherein one or more component is associated with a corresponding process, such as post-injection. In one example, the HCI energy contribution 238 is multiplied by a value of fuel energy and properties to provide an HCI flow rate signal 246. The HCI flow rate signal 246 is a command signal to control an amount fuel flowing from the HCI 154 corresponding to the HCI energy contribution value 238. In addition, an exemplary post-injection energy contribution 240 is multiplied by a fuel energy requirement per piston stroke, wherein a post-injection signal 248 is a command signal that controls the fuel system 156 mass flow rate. The post-injection signal 248 and resulting added fuel per stroke of the post-injection process provides the energy corresponding to the post-injection energy contribution value 240. The heating device energy contribution 242 is represents a command to provide a heating device signal 250 to control an amount of current directed to the heating device 150 that corresponds to the heating device energy contribution value 242.

In one embodiment where an exhaust system does not include a component, such as the HCI 154, the HCI energy contribution 238 and corresponding value for HCI flow rate signal 246 will be zero, wherein the energy to achieve the desired temperature is provided by other available processes, including the post-injection process and/or heating device 150. Thus the exemplary method and system described by the diagram 200 provides a universal energy-based determination of balanced energy contributions for various components, sources and/or processes in an exhaust system. The exemplary method and system are universal in application because they may be used with a variety of exhaust system configurations and components with little or no modification or calibration. The method and system adapt for changes in system components, flow geometries, efficiencies, energy losses and system configuration. In addition, the method and system optimize energy contributions from exhaust system components while simplifying and improving temperature control within the exhaust system.

In some embodiments, extensive testing and data logging are used to determine energy contributions and corresponding temperatures for exhaust components and arrangements for each system. Extensive testing and calibration for each exhaust system component under a variety of conditions may be used to determine operational settings via logged data. Data is also recorded and inputs adjusted for changes in engine and/or component calibration, thus leading to extensive and time consuming testing for each change in configuration. In contrast, the exemplary method and system of FIG. 2 simplifies and balances the energy contribution of each regeneration component using a plurality of inputs, wherein the balanced distribution of energy contributions improves control of the exhaust system 106 while also simplifying the system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine system comprising:
a cylinder;
a fuel system in fluid communication with the cylinder to direct a fuel flow to be mixed with air in the cylinder for a combustion process;
an exhaust system in fluid communication with the cylinder to receive an exhaust gas produced by the combustion process, wherein the exhaust system includes an oxidation catalyst, and a particulate filter downstream of the oxidation catalyst; and
a control module programmed to:
   determine an amount of energy to be provided to the exhaust gas to achieve a desired temperature at the particulate filter;
   determine the energy available from a post-injection process using the fuel system, a hydrocarbon injector, and a heating device configured to heat the exhaust gas in the particulate filter, that can be utilized to achieve the desired temperature; and
   determine a distribution of the energy available from the post-injection process, the hydrocarbon injector, and the heating device, to achieve the desired temperature.

2. The system of claim 1, wherein the control module is configured to communicate a signal to control an amount of fuel to the exhaust gas in the cylinder corresponding to the amount of energy to be provided by the post-injection process, a signal to control an amount of fuel from the hydrocarbon injector to the exhaust system corresponding to the amount of energy to be provided by the hydrocarbon injector, and a signal to control a current sent to the heating device corresponding to the amount of energy to be provided by the heating device.

3. The system of claim 1, wherein the desired temperature at the particulate filter comprises a temperature of the exhaust gas entering the particulate filter for regeneration of the particulate filter.

4. The system of claim 1, wherein the amount of energy to be provided is based on the desired temperature at particulate filter, the flow rate of the exhaust gas, the temperature of the exhaust gas received by the exhaust system, the flow rate of the exhaust gas at the inlet of the oxidation catalyst, the temperature of the exhaust gas at the inlet of the oxidation catalyst, energy losses upstream of the selected location in the exhaust system, efficiency maps for exhaust system components, and an available energy value for at least one of the hydrocarbon injector, a post-injection process for the fuel system, and the heating device.

5. The system of claim 1, wherein the control module is further programmed to determine the amount of energy to be provided to the exhaust gas to achieve the desired temperature based on:
an exhaust flow rate from the engine;
a specific heat of the exhaust gas from the engine;
a temperature of the exhaust gas from the engine;
a specific heat of the exhaust gas at the particulate filter; and
a temperature of the exhaust gas at the particulate filter.

6. The system of claim 5, wherein the control module is further programmed to determine an energy value by multiplying the exhaust flow rate by the difference of: the product of the specific heat of the exhaust gas from the engine and the temperature of the exhaust gas from the engine, and the product of the specific heat of the exhaust gas at the particulate filter and the temperature of the exhaust gas at the particulate filter.

7. The system of claim 6, wherein the control module is further programmed to:
determine an energy loss of the exhaust gas up to the particulate filter; and
further determine the amount of energy to be provided to the exhaust gas to achieve the desired temperature based on the difference of the determined energy value and the determined energy loss.

8. The system of claim 1, wherein the control module is further programmed to determine an energy efficiency of each of the oxidation catalyst, a selective catalytic reduction (SCR) device, and the heating device.

9. The system of claim 8, wherein the control module is programmed to:
- determine the energy efficiency of the oxidation catalyst based on an oxidation space velocity and a temperature of the exhaust gas entering the oxidation catalyst;
- determine the energy efficiency of the SCR device based on an SCR space velocity and a temperature of the exhaust gas entering the SCR device; and
- determine the energy efficiency of the heating device based on a heating device space velocity and a heating device temperature.

10. The system of claim 9, wherein the control module is further programmed to determine the most efficient of the post-injection process, the hydrocarbon injector, the heating device, the oxidation catalyst, and the SCR device, to determine an energy contribution from the post-injection process, the hydrocarbon injector, and the heating device to achieve the desired temperature at the particulate filter.

11. A method for controlling temperature of exhaust gas in an exhaust system of an internal combustion engine, the method comprising:
- determining a flow rate of the exhaust gas;
- determining a temperature of the exhaust gas received by the exhaust system;
- determining a space velocity of the exhaust gas at an inlet of an oxidation catalyst;
- determining a temperature of the exhaust gas at the inlet of the oxidation catalyst;
- determining an amount of energy to be provided by each of a post-injection process using a fuel system coupled to a cylinder of the internal combustion engine, a hydrocarbon injector in the exhaust system, and a heating device proximate a particulate filter, wherein the amount of energy to be provided is based on a desired temperature at a selected location in the exhaust system, the flow rate of the exhaust gas, the temperature of the exhaust gas received by the exhaust system, the flow rate of the exhaust gas at the inlet of the oxidation catalyst and the temperature of the exhaust gas at the inlet of the oxidation catalyst; and
- communicating at least one of: a signal to control an amount of fuel to the exhaust gas in the cylinder corresponding to the amount of energy to be provided by the post-injection process, a signal to control an amount of fuel from the hydrocarbon injector to the exhaust system corresponding to the amount of energy to be provided by the hydrocarbon injector and a signal to control a current sent to the heating device corresponding to the amount of energy to be provided by the heating device.

12. The method of claim 11, wherein the desired temperature at the selected location in the exhaust system comprises a temperature of the exhaust gas entering the particulate filter for regeneration of the particulate filter.

13. The method of claim 12, wherein determining the amount of energy to be provided is based on the desired temperature at the selected location in the exhaust system, the flow rate of the exhaust gas, the temperature of the exhaust gas received by the exhaust system, the flow rate of the exhaust gas at the inlet of the oxidation catalyst, the temperature of the exhaust gas at the inlet of the oxidation catalyst, energy losses upstream of the selected location in the exhaust system, efficiency maps for exhaust system components, and an available energy value for at least one of the hydrocarbon injector, a fuel post-injection process for the fuel supply and the heating device.

14. An exhaust system comprising:
- a passage to receive an exhaust gas from a cylinder of an engine and to direct the exhaust gas to an oxidation catalyst;
- a particulate filter downstream of the oxidation catalyst;
- a hydrocarbon injector upstream of the particulate filter;
- a heating device configured to heat exhaust gas in the particulate filter; and
- a control module programmed to:
  - determine an amount of energy to be provided to the exhaust gas achieve a desired temperature at the particulate filter;
  - determine the energy available from a post-injection process using a fuel system, the hydrocarbon injector, and the heating device that can be utilized to achieve the desired temperature; and
  - determine a distribution of the energy available from the post-injection process, the hydrocarbon injector, and the heating device, the achieve the desired temperature.

15. The system of claim 14, wherein the control module is further programmed, based on the determined available energy distribution, to distribute the energy available from the post-injection process, the hydrocarbon injector, and the heating device, to the exhaust gas, by communicating at least one of: a signal to control an amount of fuel to the exhaust gas in the cylinder corresponding to the amount of energy to be provided by the post-injection process, a signal to control an amount of fuel from the hydrocarbon injector to the exhaust system corresponding to the amount of energy to be provided by the hydrocarbon injector and a signal to control a current sent to the heating device corresponding to the amount of energy to be provided by the heating device.

16. The system of claim 14, wherein the desired temperature comprises a temperature of the exhaust gas entering the particulate filter for regeneration of the particulate filter.

17. The system of claim 14, wherein the amount of energy to be provided is based on the desired temperature at the particulate filter, the flow rate of the exhaust gas, the temperature of the exhaust gas received by the exhaust system, the flow rate of the exhaust gas at the inlet of the oxidation catalyst, the temperature of the exhaust gas at the inlet of the oxidation catalyst, energy losses upstream of the selected location in the exhaust system, efficiency maps for exhaust system components, and an available energy value for at least one of the hydrocarbon injector, a fuel post-injection process for the post-injection fuel system to the cylinder, and the heating device.

* * * * *